United States Patent [19]

Makino et al.

[11] Patent Number: 4,465,536

[45] Date of Patent: Aug. 14, 1984

[54] METHOD OF AND APPARATUS FOR FEEDING RUBBERY STRIP TO TIRE-BUILDING DRUM

[75] Inventors: Hisao Makino; Tsuginori Oshima, both of Higashimurayama, Japan

[73] Assignee: Bridgestone Tire Company, Limited, Tokyo, Japan

[21] Appl. No.: 373,247

[22] Filed: Apr. 29, 1982

[30] Foreign Application Priority Data

May 1, 1981 [JP] Japan .................................. 56-67132
May 1, 1981 [JP] Japan .................................. 56-67133

[51] Int. Cl.³ ......................................... B29H 17/20
[52] U.S. Cl. .................................. 156/133; 156/405.1; 156/406.6; 156/408; 156/414; 156/128.1
[58] Field of Search .................. 156/128.1, 128.6, 129, 156/130, 133–134, 405.1, 406.4, 406.6, 408, 414–420

[56] References Cited

U.S. PATENT DOCUMENTS 3,418,191 12/1968 Dieckmann et al. ............. 156/405.1
4,163,685 8/1979 Kubinski et al. ................. 156/405 R

FOREIGN PATENT DOCUMENTS 54-131681 10/1979 Japan.

Primary Examiner—Lois E. Boland
Attorney, Agent, or Firm—Cushman, Darby & Cushman

[57] ABSTRACT

For automatically feeding a rubbery strip to a tire-building drum for the production of, for example, a green tire, the rubbery strip is forwardly conveyed toward the tire-building drum until a leading end portion thereof is received on a smooth surface with one face of the leading end portion directed toward the tire-building drum so as to establish close contact between the other face of the leading end portion of the rubbery strip and the smooth surface portion throughout the width of the rubbery strip whereby the leading end portion of the rubbery strip is detachably retained to the smooth surface portion, whereupon the leading end portion of the rubbery strip is transferred from the surface portion to the tire-building drum for permitting the leading end portion of the strip to be wrapped round the tire-building drum and thereafter the leading end portion of the rubbery strip is cut from the remainder of the strip for forming a cut segment having a predetermined length, the tire-building drum being thereafter driven for rotation about the center axis thereof for causing the cut segment of the rubbery strip to be wrapped round the tire-building drum.

7 Claims, 17 Drawing Figures

METHOD OF AND APPARATUS FOR FEEDING RUBBERY STRIP TO TIRE-BUILDING DRUM

FIELD OF THE INVENTION

The present invention relates to a method of feeding a rubbery strip to a tire-building drum and to a rubbery-strip feeding apparatus adapted to carry out such a method. More particularly, the present invention relates to a method of and an apparatus for feeding a tire-building drum with a rubbery strip composed of, for example, a breaker strip, a side wall strip, a layer of chafer or rubberized canvas sheet and a undercushion strip to be applied to, for example, an unvulcanized sheet material such as a tire case to form a green tire.

BACKGROUND OF THE INVENTION

Various research and development efforts are being paid extensively in the tire manufacturing industry in quest of systems and processes to produce pneumatic tires with improved qualities at enhanced efficiencies. Such efforts are mostly directed at realizing completely automated tire building equipment to make it possible to manufacture pneumatic tires without having recourse to any human intervention.

The demand for improvements is eager and pressing especially in the field of producing green tires from unvalcanized rubbery strips on tire-building drums. This is because of the fact that intricate, highly skilled techniques and knowhows are required in correctly and accurately feeding resilient tire-forming strips and segments to a rotating tire-building drum. Extreme difficulties have thus been encountered in realizing fully automated equipment capable of correctly feeding such yielding materials to a tire-building drum.

One of the prior-art systems to automatically feed rubbery strips to tire-building drums for the manufacture of green tires is taught in Japanese Preliminary Publication of Patent No. 54-131681. In the rubbery-strip feeding apparatus disclosed therein, however, a drawback is pointed out in that the cut segment of a supplied rubbery strip is transferred to a rotating tire-building drum without being retained to any constraining means. If the rubbery strip to be fed to the tire-building drum has a thickness irregularly varying widthwise of the strip or is composed of two or more component strip members or portions formed of different materials, the rubbery strip tends to shrink longitudinally over its opposite side portions and to consequently invite reduction of width longitudinally of the strip. Since, in this instance, the rubbery strip being transferred to the tire-building drum is not constrained from causing such shrinkage, the rubbery strip is unable to maintain its initial thickness and width throughout the length of the cut segment to be applied to the tire-building drum or to any sheet material preliminarily wrapped round the tire-building drum. The present invention contemplates elimination of such a drawback in a prior-art rubbery-strip feeding apparatus of the described general character.

SUMMARY OF THE INVENTION

In accordance with one important aspect of the present invention, there is provided a method of automatically feeding a rubbery strip to a tire-building drum rotatable about the center axis thereof, comprising conveying the rubbery strip forwardly toward the tire-building drum; receiving a leading end portion of the rubbery strip on a smooth surface portion with one face of the leading end portion directed toward the tire-building drum; establishing close contact between the other face of the leading end portion of the rubbery strip and the smooth surface portion substantially throughout the width of the rubbery strip for detachably retaining the leading end portion of the rubbery strip to the smooth surface portion; transferring the leading end portion of the rubbery strip from the surface portion to the tire-building drum for permitting the leading end portion to be wrapped round the tire-building drum; and cutting the leading end portion of the rubbery strip to a predetermined length from the remainder of the strip for forming a cut segment having the predetermined length; and driving the tire-building drum for rotation about the center axis thereof for causing the cut segment to be wrapped round the tire-building drum. The leading end portion of the rubbery strip may be transferred from the smooth surface portion to the tire-building drum by separating the leading end portion of the rubbery strip from the smooth surface portion; elastically pressing the leading end portion of the rubbery strip against the outer peripheral surface of the tire-building drum; and driving the tire-building drum to turn about the center axis thereof while maintaining a tension in the leading end portion of the rubbery strip being transferred from the smooth surface portion to the tire-building drum. The above mentioned smooth surface portion may be constituted of a first smooth surface portion out of two smooth surface portions consisting of the first smooth surface portion and a second smooth surface portion, in which instance the cut segment of the rubbery strip may have a trailing end portion received on the second smooth surface portion after the segment is cut from the remainder of the rubbery strip, the trailing end portion of the cut segment having one face to be received on the tire-building drum and establishing close contact between the other face thereof and the second smooth surface portion substantially throughout the width of the cut segment for being detachably retained to the second smooth surface portion. In this instance, the leading end portion of the cut segment may be transferred from the smooth surface portion to the tire-building drum by driving the tire-building drum to turn about the center axis thereof for causing the cut segment to be wrapped round the tire-building drum toward the trailing end of the cut segment while maintaining a tension in the cut segment intervening between the tire-building drum and the second smooth surface portion; elastically pressing the trailing end portion of the cut segment against the outer peripheral surface of the tire-building drum; and separating the trailing end portion of the cut segment from the second smooth surface portion. If desired, the tire-building drum may be temporarily brought to a stop after the tire-building drum is turned through a predetermined angle about the center axis thereof, in which instance the leading end portion of the rubbery strip is cut from the remainder of the rubbery strip and the resultant cut segment of the rubbery strip is detachably retained to the second smooth surface portion while the tire-building drum is held at rest.

In accordance with another important aspect of the present invention, there is provided a rubbery-strip feeding apparatus for automatically feeding a rubbery strip to a tire-building drum rotatable about the center axis thereof, comprising conveyor means for conveying the rubbery strip forwardly toward the tire-building drum; rubbery-strip carrier and transfer means having a smooth surface portion extending substantially in parallel with the axis of rotation of the tire-building drum and having a width substantially equal to the width of the rubbery strip, the rubbery-strip carrier and transfer means being adapted to have a leading end portion of the rubbery strip received on the smooth surface portion thereof substantially throughout the width of the rubbery strip with one face of the leading end portion directed toward the tire-building drum; rubbery-strip pressing means operative to establish close contact between the other face of the leading end portion of the rubbery strip and the smooth surface portion of the rubbery-strip carrier and transfer means for detachably retaining the leading end portion of the rubbery strip to the smooth surface portion; the rubbery-strip carrier and transfer means being movable between a position operative to have the leading end portion of the rubbery strip received on the smooth surface portion thereof, and a position to permit the leading end portion of the rubbery strip to be transferred from the surface portion to the tire-building drum and wrapped round the tire-building drum; and cutting means operative to cut the leading end portion of the rubbery strip to a predetermined length from the remainder of the strip for forming a cut segment having the predetermined length. The rubbery-strip carrier and transfer means of the apparatus thus constructed generally may have a predetermined cutting zone extending substantially in parallel with the axis of rotation of the tire-building drum and comprises first and second carrier blocks each movable with respect to the tire-building drum to a first predetermined position close to the predetermined cutting zone, a second predetermined position close to the tire-building drum and a third predetermined position opposite to the first predetermined position across the second predetermined position in a direction parallel with the direction in which the rubbery strip is to be conveyed toward the tire-building drum, and first and second transfer blocks movable with the first and second carrier blocks, respectively, with respect to the tire-building drum, each of the first and second transfer blocks having a surface portion constituting the smooth surface portion and being further movable with respect to each of the carrier blocks between a first predetermined position where the smooth surface portion thereof is located on a first predetermined plane substantially parallel with the axis of rotation of the tire-building drum and close to the outer peripheral surface of the tire-building drum and a second predetermined position where the smooth surface portion thereof is located on a second predetermined plane substantially parallel with the first predetermined plane and remoter from the tire-building drum than the first predetermined plane. In this instance, each of the first and second transfer blocks may comprise an inflatable tubular member having a surface portion constituting the smooth surface portion, the tubular member further having an internal space communicable with a source of air under pressure, the tubular member of the first transfer block being operative to have the leading end portion of the rubbery strip received on the smooth surface portion thereof when the first carrier block is held in the first predetermined position thereof with respect to the tire-building drum and concurrently the first transfer block is held in the first predetermined position thereof with respect to the first carrier block and being further operative to elastically press the leading end portion of the rubbery strip against the outer peripheral surface of the tire-building drum when inflated with air under pressure and when the first carrier block is held in the second predetermined position thereof with respect to the tire-building drum and concurrently the first transfer block is held in the first predetermined position thereof with respect to the first carrier block, the tubular member of the second transfer block being operative to have a trailing end portion of the cut segment received on the smooth surface portion thereof when the second carrier block is held in the first predetermined position thereof with respect to the tire-building drum and concurrently the second transfer block is held in the first predetermined position thereof with respect to the second carrier block and being further operative to elastically press a trailing end portion of the cut segment against the outer peripheral surface of the tire-building drum when inflated with air under pressure and when the second carrier block is held in the second predetermined position thereof with respect to the tire-building drum and concurrently the second transfer block is held in the first predetermined position thereof with respect to the second carrier block.

BRIEF DESCRIPTION OF THE DRAWINGS

The features and advantages of a method and an apparatus according to the present invention will be appreciated more clearly from the following description taken in conjunction with the accompanying drawings, in which.

DESCRIPTION OF THE PREFERRED EMBODIMENT

Figure 1:
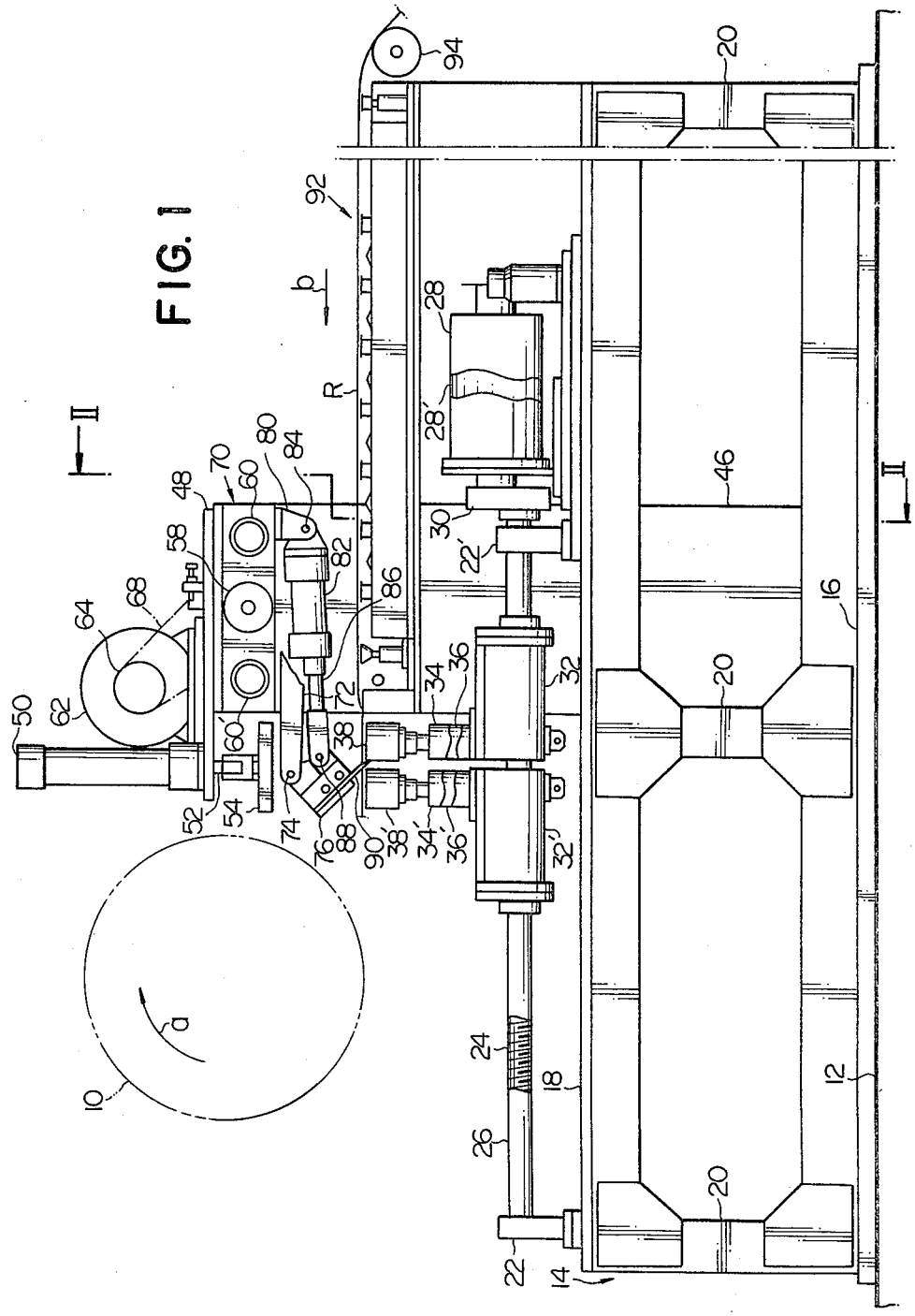
FIG. 1 is a side elevation view of a preferred embodiment of a rubbery-strip feeding apparatus according to the present invention.
Figure 2:
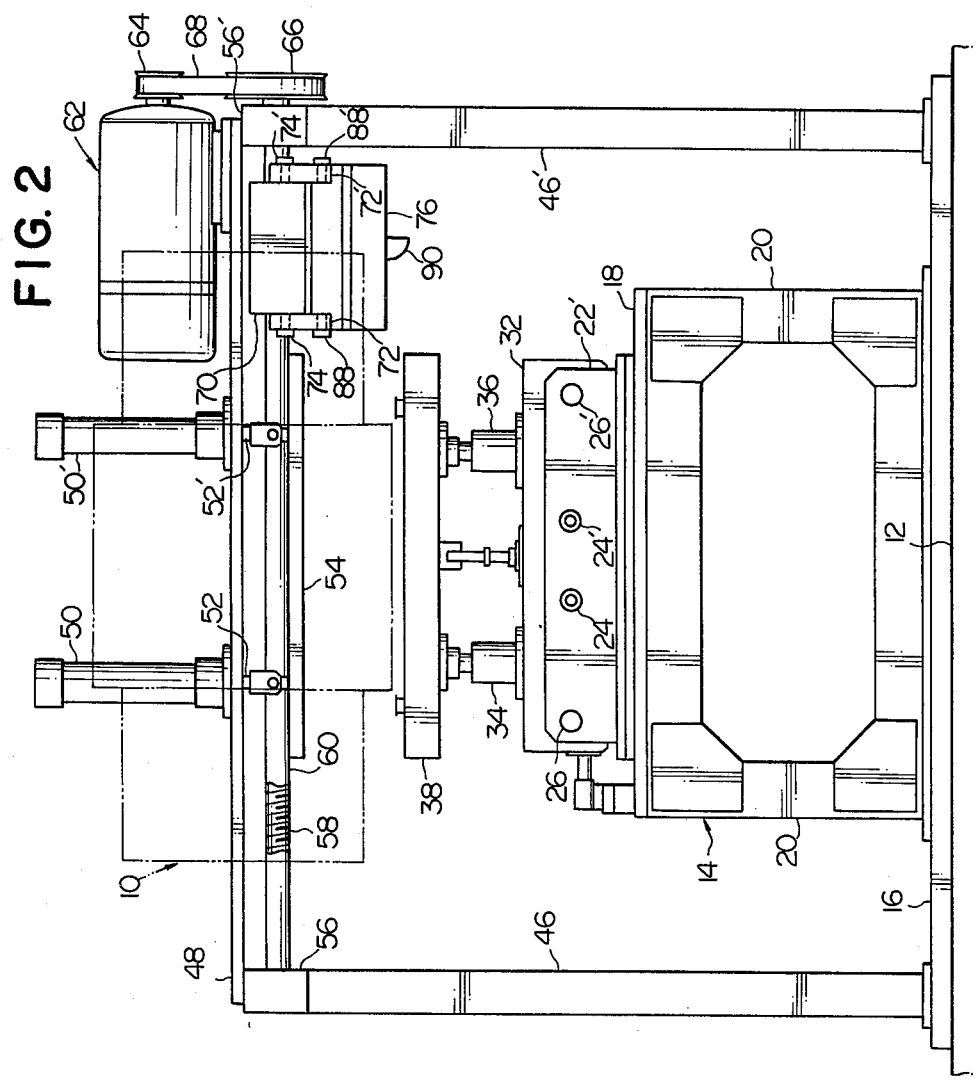
FIG. 2 is a rear end view of the rubbery-strip feeding apparatus shown in FIG. 1, the apparatus herein shown being viewed from vertical planes indicated by lines II—II in FIG. 1.

In FIGS. 1 and 2 of the drawings is shown a rubbery-strip feeding apparatus embodying the present invention and thus adapted to carry out a method according to the present invention. The rubbery-strip feeding apparatus is arranged intermediate between suitable rubbery-strip feed means such as a rubbery-strip stock roller (not shown) and rubbery-strip take-up means including a tire-building drum 10 indicated by dots-and-dash lines in FIGS. 1 and 2. The rubbery-strip stock roller is driven by suitable drive means provided therefor and is operative to deliver an elongate rubbery strip R at controlled rates and at controlled time intervals therefrom during consecutive cycles of operation of the rubbery-strip feeding apparatus. The rubbery-strip feeding apparatus as a whole is positioned on a horizontal floor surface 12 and is operative to laterally or widthwise cut the supplied rubbery strip R for forming a predetermined length of a cut segment S and to feed the cut segment S to the tire-building drum 10 during each cycle of operation of the rubbery-strip feeding apparatus. Thus, the apparatus embodying the present invention has a horizontal fore-and-aft direction (horizontal in FIG. 1) in which the rubbery strip R continuous from the stock roller is to be conveyed toward the tire-building drum 10, and a horizontal lateral direction (horizontal in FIG. 2) at right angles to the fore-and-aft direction. The tire-building drum 10 is rotatable about its horizontal center axis fixed with respect to the floor surface 12 and directed in a lateral direction of the rubbery-strip feeding apparatus and is operatively connected to suitable drive means (not shown) adapted to drive the tire-building drum 10 for rotation at a controlled speed about the center axis thereof in a direction indicated by arrow a in FIG. 1. The tire-building drum 10 has a width larger or at least not less than the width of the elongate rubbery strip R to be supplied from the above mentioned stock roller and is herein assumed, by way of example, as being of the type which is variable in diameter throughout the axial length thereof and, furthermore, having a smooth outer peripheral surface.

The rubbery-strip feeding apparatus thus arranged intermediate between the rubbery-strip feed and take-up means comprises a frame structure 14 including a horizontal base plate 16 fixedly mounted on the floor surface 12 and a horizontal lower support plate 18 positioned at a suitable height above the floor surface 12 and securely connected to the base plate 16 by a plurality of support posts 20 upstanding from the base plate 16. The support plate 18 has a portion located below the tire-building drum 10 and has fixedly mounted on the upper face thereof front and rear bearing blocks 22 and 22' which are spaced apart a suitable distance from each other in a fore-and-aft direction of the frame structure 14 as will be better seen from FIG. 1.

The bearing blocks 22 and 22' have supported thereon first and second worm shafts 24 and 24' and a pair of guide rods 26 and 26'. The first and second worm shafts 24 and 24' axially extend between the bearing blocks 22 and 22' in fore-and-aft directions of the frame structure 14 and are spaced apart in parallel from each other laterally of the frame structure 14. Likewise, the guide rods 26 and 26' axially extend between the bearing blocks 22 and 22' in fore-and-aft directions of the frame structure and are laterally spaced apart in parallel from and on both sides of the worm shafts 24 and 24', respectively, as will be seen from the illustration of FIG. 2. Each of the worm shafts 24 and 24' has opposite axial end portions respectively journaled in the front and rear bearing blocks 22 and 22', while each of the guide rods 26 and 26' have opposite axial end portions respectively secured to the bearing blocks 22 and 22'. The first and second worm shafts 24 and 24' axially extend rearwardly beyond the rear bearing block 22' for operative connection to first and second drive units 28 and 28', respectively, which are also mounted on the lower support plate 18 of the frame structure 14. Each of the first and second drive units 28 and 28' has an output shaft which extends axially in parallel with rearward extensions of the respective axes of rotation of the worm shafts 24 and 24', viz., in a fore-and-aft direction of the rubbery-strip feeding apparatus and which is connected through a suitable coupling member (not shown) to the input shaft of a reduction gear unit 30. The reduction gear unit 30 in turn has its output shaft connected through a suitable coupling member (not shown) to the associated one of the worm shafts 24 and 24'. Each of the drive units 28 and 28' thus provided in association with the first and second worm shafts 24 and 24', respectively, is herein assumed, by way of example, as being constituted by an electric pulsating-current motor of the reversible type.

The rubbery-strip feeding apparatus embodying the present invention further comprises first and second carrier blocks 32 and 32' which are juxtaposed in fore-and-aft direction of the rubbery-strip feeding apparatus and which are spaced apart from each other rearwardly and forwardly from the second and first carrier blocks 32' and 32, respectively, as shown in FIG. 1. The first carrier block 32 is supported on and movable along the first worm shaft 24 and the guide rods 26 and 26' and, likewise, the second carrier block 32' is supported on and movable along the second worm shaft 24' and the guide rods 26 and 26'. The first carrier block 32 has incorporated therein a suitable gear (not shown) held in mesh with the first worm shaft 24 and is movable back and forth on and along the worm shaft 24 and the guide rods 26 and 26' when the worm shaft 24 is driven for rotation in either direction about the center axis thereof by the first drive unit or pulsating-current motor 28. Similarly, the second carrier block 32' has incorporated therein a suitable gear (not shown) held in mesh with the second worm shaft 24' and is movable back and forth on and along the worm shaft 24' and the guide rods 26 and 26' when the worm shaft 24' is driven for rotation in either direction about the center axis thereof by the driven unit or pulsating-current motor 28'. The first worm shaft 24, the first pulsating-current motor 28 and the gear thus incorporated in the first carrier block 32 constitute, in combination, first drive means adapted to drive the first carrier block 32 to move forwardly or backwardly in a fore-and-aft direction of the rubbery-strip feeding apparatus with respect to the frame structure 14 in response to electric signals fed to the motor 28 or to any control means (not shown) for the motor 28. Likewise, the second worm shaft 24', the second pulsating-current motor 28' and the gear incorporated in the second carrier block 32' constitute, in combination, second drive means adapted to drive the second carrier block 32' to move forwardly or backwardly in a fore-and-aft direction of the frame structure 14 in response to electric signals fed to the motor 28' or to any control means (not shown) for the motor 28'. The carrier blocks 32 and 32' are, thus movable independently of each other in a fore-and-aft direction of the frame structure 14 and accordingly to the tire-building drum 10 above the support plate 18. The worm and gear arrangement composed of each of the worm shafts 24 and 24' and the gear incorporated in each of the carrier blocks 32 and 32' as described above is simply by way of example and may be substituted by any other form of rotary-to-reciprocating motion conversion means similar in effect to the combination of a worm shaft and a gear in mesh with the shaft.

The first carrier block 32 has supported thereon a first pair of fluid-operaterd power cylinders 34 and 36 each having a cylinder body securely connected to and upstanding from the carrier block 32 and, likewise, the second carrier block 32' has supported thereon a second pair of fluid-operated power cylinders 34' and 36' each having a cylinder body securely connected to and upstanding from the carrier block 32'. The first pair of fluid-operated power cylinders 34 and 36 further have piston rods extending upwardly from the respective cylinder bodies thereof and connected at their uppermost leading ends to a first transfer block 38 which is elongated in parallel with the axis of rotation of the tire-building drum 10. The first transfer block 38 is thus movable upwardly and downwardly between predetermined upper and lower or first and second predetermined positions above and with respect to the first carrier block 32 as the piston rods of the power cylinders 34 and 36 are caused to axially protrude upwardly from and retract downwardly into the respective cylinder bodies thereof. Similarly, the second pair of fluid-operated power cylinders 34' and 36' further have piston rods extending upwardly from the respective cylinder bodies thereof and connected at their uppermost leading ends to a second transfer block 38' which is also elongated in parallel with the axis of rotation of the tire-building drum 10. The second transfer block 38' is thus also movable upwardly and downwardly between predetermined upper and lower or first and second predetermined positions above and with respect to the second carrier block 32' as the piston rods of the power cylinders 34' and 36' are caused to axially protrude upwardly from and retract downwardly into the respective cylinder bodies thereof. The first transfer block 38 carried by the piston rods of the first pair of fluid-operated power cylinders 34 and 36 and the second transfer block 38' carried by the piston rods of the second pair of fluid-operated power cylinders 34' and 36' as above described are elongated in lateral directions of the rubbery-strip feeding apparatus and have, in the particular directions, lengths which are slightly larger than or at least not less than the width of a rubbery strip R to be fed to the tire-building drum 10. The detailed construction of each of the first and second transfer blocks 38 and 38' is shown in FIG. 3 of the drawings.

Figure 3:
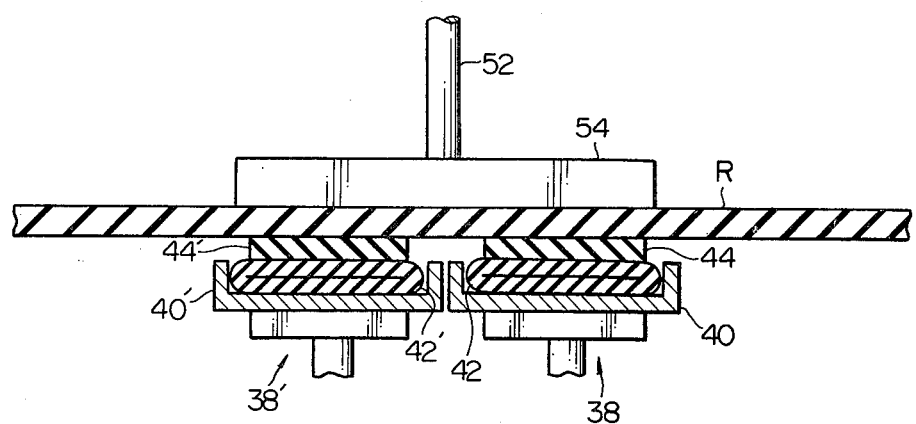
FIG. 3 is a vertical sectional view showing, to an enlarged scale, portions of rubbery-strip carrier and transfer means forming part of the rubbery-strip feeding apparatus illustrated in FIGS. 1 and 2, the carrier and transfer means being shown in one operative condition thereof.
Figure 4:
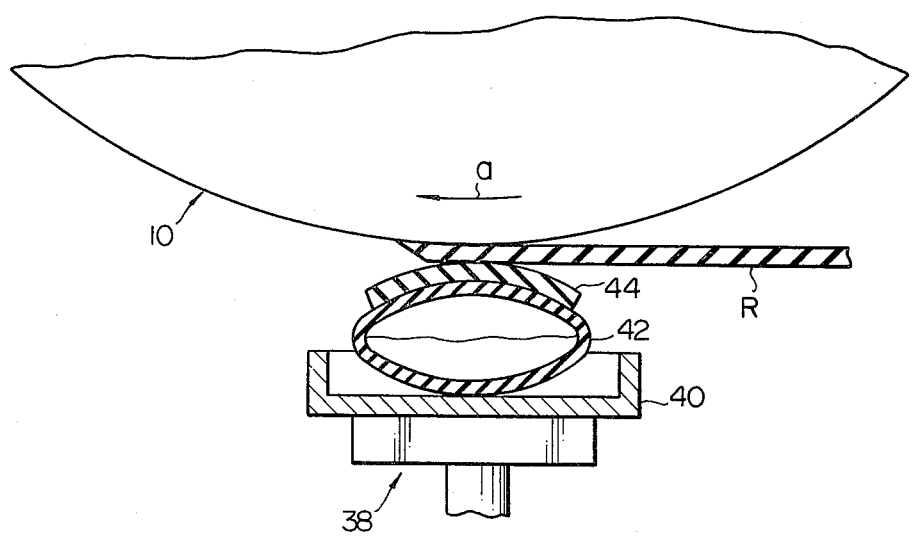
FIG. 4 is a vertical sectional view showing, also to an enlarged scale, portions of the rubbery-strip carrier and transfer means, in another operative condition thereof, of the rubbery-strip feeding apparatus shown in FIGS. 1 and 2.

Referring to FIG. 3, the first transfer block 38 comprises a support member 40 formed with an elongated, upwardly open concavity, an elastic inflatable tubular member 42 having closed or sealed opposite ends, and an elastic contact strip 44. The support member 40 is elongated in a lateral direction of the rubbery-strip feeding apparatus and is securely carried by the respective piston rods of the first pair of fluid-operated power cylinders 34 and 36 (FIGS. 1 and 2). The inflatable tubular member 42 consists essentially of lower and upper strip portions and has the lower strip portion having its lower or outer surface partially bonded or otherwise securely attached to the upper face of the support member 40 substantially throughout the length of the elongated concavity in the support member 40. The tubular member 42 is elastically expansible vertically with its lower and upper strip portions spaced apart from each other substantially throughout the length of the member 42 as will be seen from FIG. 4. The tubular member 42 extends in a lateral direction of the rubbery-strip feeding apparatus with a length larger or at least not less than the width of the elongate rubbery strip R to be supplied. The pressing strip 44 has a lower surface glued, bonded or otherwise securely attached to the upper or outer surface of the upper strip portion of the tubular member 42 and has a smooth upper or outer surface throughout its length which is equal to the length of the tubular member 42. Similarly to the first transfer block 38 thus constructed, the second transfer block 38' comprises a support member 40' formed with an elongated, upwardly open concavity, an elastic inflatable tubular member 42' having closed opposite ends, and an elastic contact strip 44'. The support member 40' is elongated in a lateral direction of the rubbery-strip feeding apparatus and is securely carried by the respective piston rods of the second pair of fluid-operated power cylinders 34' and 36' (FIG. 2). The inflatable tubular member 42' also consists essentially of lower and upper strip portions and has the lower strip portion having its lower or outer surface partially secured to the upper face of the support member 40' substantially throughout the length of the concavity in the support member 40'. The tubular member 42' is also elastically expansible vertically with its lower and upper strip portions spaced apart from each other subtantially throughout the length of the member 42' and extends in a lateral direction of the rubbery-strip feeding apparatus with a length larger or at least not less than the width of the elongate rubbery strip R to be supplied. The contact strip 44' has a lower surface also glued, bonded or otherwise securely attached to the upper or outer surface of the upper strip portion of the tubular member 42' and has a smooth upper or outer surface throughout its length which is equal to the length of the tubular member 42'. Though not shown in the drawings, the interstice or gap formed between the lower and upper strip portions of each of the inflatable tubular members 42 and 42' is communicable through a valved air-feed passageway with a suitable source of air under pressure such as, for example, an air compressor. When a valve provided in the air-feed passageway leading from the source of air under pressure to one of the inflatable tubular members 42 and 42' is open, the air under pressure is directed through the passageway into the tubular member 42 or 42' and forces the particular tubular member to expand with its lower and upper strip portions spaced apart vertically from each other as shown in FIG. 4 in connection with each of the tubular members 42 and 42' of the first and second transfer blocks 38 and 38'. When, on the other hand, the valve in the air-feed passageway leading to one of the tubular members 42 and 42' is closed, the particular tubular member 42 or 42' is allowed to remain in a collapsed or flattened condition with its lower and upper strip portions held in contact with each other as shown in FIG. 3 in connection with each of the inflatable tubular members 42 and 42'. Each of the contact strips 44 and 44' of the first and second transfer blocks 38 and 38', respectively, is preferably formed of vulcanized rubber. The contact strips 44 and 44' are, furthermore, herein assumed as being formed separately of the tubular members 42 and 42' but, if desired, may be formed as integral portions of the tubular members 42 and 42', respectively. For the reason which will be understood as the description proceeds, the outer peripheral surface of the tire-building drum 10 (FIGS. 1 and 2) is preferably finished to be smoother than the upper or outer surfaces of the contact strips 44 and 44' thus attached to or integral with the tubular members 42 and 42', respectively, of the first and second transfer blocks 38 and 38'. Turning back to FIGS. 1 and 2, the first and second carrier blocks 32 and 32', fluid-operated power cylinders 34, 34', 36 and 36', and first and second transfer blocks 38 and 38' constructed and arranged as above described constitute, in combination, rubbery-strip carrier and transfer means to have the supplied rubbery strip R received on the first and second transfer blocks 38 and 38' adjacent the leading end of the rubbery strip R and to carry a leading end portion of the rubbery strip R from a predetermined zone ahead of the tire-building drum 10 to another predetermined zone ready to be transferred to the outer peripheral surface of the tire-building drum 10 during each cycle of operation of the rubbery-strip feeding apparatus as will be later described in more detail.

The rubbery-strip feeding apparatus embodying the present invention further comprises rubbery-strip pressing means adapted to hold a leading end portion of the supplied rubbery strip R in a predetermined cutting zone in which the leading end portion of the rubbery strip R is to be cut from the remainder of the strip R in a lateral direction of the strip during each cycle of operation of the feeding apparatus. For this purpose, the previously mentioned frame structure 14 further comprises a pair of vertical side walls 46 and 46' upstanding from outer side end portions of the base plate 16, and a horizontal upper support plate 48 securely connected along its opposite side end portions to the side walls 46 and 46' and having a portion above the rubbery-strip carrier and transfer means mounted on the lower support plate 18 as will be seen from FIGS. 1 and 2. The above mentioned rubbery-strip pressing means comprises a pair of fluid-operated power cylinders 50 and 50' positioned at a spacing from each other in a lateral direction of the rubbery-strip feeding apparatus and each having a cylinder body fixedly mounted on and upstanding from the upper support plate 48. The power cylinders 50 and 50' further have piston rods 52 and 52' extending downwardly from the respective cylinder bodies of the power cylinders 50 and 50' and jointly having a pressing block 54 fixedly carried at the lowermost leading ends of the piston rods 52 and 52'. The pressing block 54 is thus movable downwardly and upwardly with respect to the upper support plate 48 of the frame structure 14 as the respective piston rods 52 and 52' of the power cylinders 50 and 50' are caused to axially protrude downwardly from and retract upwardly into the cylinder bodies of the power cylinders. The pressing block 54 has a horizontal flat, smooth lower face extending in a lateral direction of the rubbery-strip feeding apparatus with a length larger or at least not less than the width of the elongate rubbery strip R to be supplied, the lower face of the pressing block 54 being located above the previously mentioned predetermined cutting zone. Each of the fluid-operated power cylinders 50 and 50' is preferably constituted by a pneumatic power cylinder.

The rubbery-strip feeding apparatus according to the present invention further comprises cutting means adapted to cut a leading end portion of the supplied rubbery strip R from the remainder of the strip R in a lateral direction of the strip during each cycle of operation of the feeding apparatus as above mentioned. In the embodiment of the feeding apparatus as herein shown, such cutting means comprises a pair of bearing blocks consisting of first and second bearing blocks 56 and 56' which are fixedly mounted on the above mentioned side walls 46 and 46', respectively, of the frame structure 14 adjacent the upper ends of the side walls and which are accordingly spaced apart a suitable distance from each other in a lateral direction of the rubbery-strip feeding apparatus, as will be seen from FIG. 2.

The bearing blocks 56 and 56' have supported thereon a worm shaft 58 and a pair of guide rods 60 and 60'. The worm shaft 58 axially extends between the bearing blocks 56 and 56' in a lateral direction of the rubbery-strip feeding apparatus, and the two guide rods 60 and 60' axially extend between the first and second bearing blocks 56 and 56' also in lateral directions of the rubbery-strip feeding apparatus and are spaced apart in parallel from and on both sides of the worm shaft 58, as will be seen from the illustration of FIG. 1. The worm shaft 58 has opposite axial end portions respectively journaled in the first and second bearing blocks 56 and 56', while each of the guide rods 60 and 60' have opposite axial end portions respectively secured to the bearing blocks 56 and 56'. The worm shaft 58 axially extends beyond one of the side walls such as the side wall 46' of the frame structure 14 as shown for operative connection to a drive unit 62 which is mounted on the upper support plate 48 of the frame structure 14. The drive unit 62 has an output shaft which axially extends in parallel with the axis of rotation of the worm shaft 58, viz., in a lateral direction of the rubbery-strip feeding apparatus and which has a driving pulley 64 securely and coaxially carried thereon. The driving pulley 64 forms part of a belt and pulley arrangement which intervenes in effect between the drive unit 62 and the above mentioned worm shaft 58 and which thus further comprises a driven pulley 66 (FIG. 2) coaxially mounted on an axial end portion of the worm shaft 58 projecting from the bearing block 56'. An endless belt 68 is passed between these driving and driven pulleys 64 and 66 so as to be operative to transmit rotation of the output shaft of the drive unit 62 to the worm shaft 58 through the driving pulley 64, endless belt 68 and driven pulley 66. The worm shaft 58, the gear incorporated in a carrier block 70, the drive unit 62, and the belt and pulley arrangement including the pulleys 64 and 66 and the endless belt 68 as above described constitute, in combination, drive means for driving the carrier block to move in either direction on and along the worm shaft 58 in response to electric signals fed to the drive unit 62 or to any control means (not shown) for the drive unit 62. The drive unit 62 forming part of such drive means is herein assumed, by way of example, as being constituted by an electric pulsating-current motor of the reversible type.

The cutting means of the rubbery-strip feeding apparatus embodying the present invention further comprises a carrier block 70 which is supported on and movable along the worm shaft 58 and the guide rods 60 and 60'. The carrier block 70 has incorporated therein a suitable gear (not shown) held in mesh with the worm shaft 58 and is movable back and forth on and along the worm shaft 58 and the guide rods 60 and 60' when the worm shaft 58 is driven for rotation in either direction about the center axis thereof by the drive unit or pulsating-current motor 62. The carrier block 70 is, thus, movable on and along the worm shaft 58 in a lateral direction of the rubbery-strip feeding apparatus with respect to the upper support plate 48 of the frame structure 14 and accordingly to the tire-building drum 10. The worm shaft 58, the pulsating-current motor 62 and the gear thus incorporated in the carrier block 70 constitute, in combination, drive means adapted to drive the carrier block 70 to move in a lateral direction of the rubbery-strip feeding apparatus with respect to the frame structure 14 in response to electric signals fed to the motor 62 or to any control means (not shown) for the motor 62. The worm and gear arrangement composed of the worm shaft 58 and the gear incorporated in the carrier block 70 as described above is simply by way of example and may be substituted, if desired, by any other form of rotary-to-reciprocating motion conversion means similar in effect to the combination of the worm shaft and the gear.

The carrier block 70 has supported thereon a pair of supporting arm members 72 and 72' securely connected each adjacent one end thereof to the carrier block 70. The arm members 72 and 72' extend forwardly of the rubbery-strip feeding apparatus and are further pivotally connected adjacent the other ends thereof to a cutter support block 76 by means of pivot pins 74 and 74' parallel with the worm shaft 58 and axially aligned with each other as shown in FIG. 1. The cutter support block 76 is thus pivotally movable about the pivot pins 74 and 74' with respect to the arm members 72 and 72'. The carrier block 70 further has a pair of bracket members 80 projecting downwardly therefrom adjacent the rear end of the block 70 and supporting a fluid-operated power cylinder 82 longitudinally extending forwardly from the bracket members 80. The fluid-operated power cylinder 82 has a cylinder body pivotally connected to the bracket members 80 by means of a pivot pin 84 also parallel with the above mentioned worm shaft 58. The power cylinder 82 further has a piston rod 86 pivotally connected at its foremost leading end to the cutter support block 76 by menas of a pivot pin 88 paralel with the pivot pin 84 on the bracket members 80. The cutter support block 76 is thus angularly movable in opposite directions about the aligned center axes of the pivot pins 74 and 74' on the arm members 72 and 72' as the piston rod 86 of the power cylinder 82 is caused to axially protrude forwardly from and retract rearwardly into the cylinder body thereof. The cutter support block 76 has carried thereon a generally sector-shaped cutter blade 90 having an edge portion projecting from the block 76. The cutter support block 76 is rockable about the aligned center axes of the pivot pins 74 and 74' on the supporting arm members 72 and 72' between a first angular position having the cutter blade 90 held in an inoperative position having its edge portion raised on a horizontal plane above the predetermined cutting zone in front of the path of the rubbery strip R on the conveyor system 92 and a second angular position. In the second angular position, the cutter blade 90 is directed at a predetermined angle to a horizontal plane and partially aligned, in a lateral direction of the rubber-strip feeding apparatus, with the predetermined cutting zone in front of the path of the elongate rubbery strip R to be conveyed toward the tire-building drum 10 as will be understood more clearly as the description proceeds. Though not shown in the drawings, the cutter blade 90 is connected to a suitable electric heater element adapted to heat the cutter blade 90 when electrically actuated. The fluid-operated power cylinder 82 is preferably constituted by a pneumatic power cylinder.

The rubbery-strip feeding apparatus embodying the present invention further comprises rubbery-strip conveyor means including, for example, a motor-driven roller conveyor system which is generally denoted by 92 in FIG. 1. The roller conveyor system 92 longitudinally extends between the previously mentioned stock roller and the rubbery-strip carrier and transfer means and is adapted to convey the elongate rubbery strip R forwardly from the stock roller toward the rubbery-strip carrier and transfer means as indicated by arrow b in FIG. 1 at a controlled velocity and controlled time intervals, viz., in accordance with prescribed schedules. The roller conveyor system 92 comprises suitable tensioning means to maintain a proper tension in the elongate rubbery strip R being conveyed on the conveyor system while a leading end portion of the rubbery strip R is being wrapped on the tire-building drum 10. In FIG. 1, such tensioning means is shown including a braking roller 92 located adjacent the rear end of the conveyor system 92 as shown and rotatable about an axis in a lateral direction of the rubbery-strip feeding apparatus. If desired, the tensioning means may further comprises suitable nip rolles to have the rubbery strip R nipped therebetween while being transferred from the stock roller to the conveyor system 92 and/or suitable speed regulator means to regulate the speed of rotation of the braking roller 94 in accordance with the speed of rotation of the tire-building drum 10. Though not shown in the drawings, furthermore, there is further provided suitable control means adapted to control the timings at which the tire-building drum 10, the motors 28 and 28', the power cylinders 34, 34', 36 and 36', the power cylinders 50 and 50', the motor 62, the power cylinder 82, the heater element for the cutter blade 90, the conveyor system 92, and the pressurized air source communicating with the inflatable tubular members 42 and 42' (FIG. 3) are to be individually made operative and inoperative and the speeds at which the tire-building drum 10, the pulsating-current motors 28, 28' and 62 and the conveyor system 92 are to operate during each cycle of operation of the rubbery-strip feeding apparatus.

Description will be hereinafter made with reference to FIGS. 1 to 4 and further to FIGS. 5A to 5L of the drawings in regard to a method according to the present invention as carried out with use of the rubber-strip feeding apparatus embodying the present invention as hereinbefore described.

Before the rubbery-strip feeding apparatus embodying the present invention is started for operation, the rubbery strip R to form a vehicle tire on the tire-building drum 10 is wound in layers on the stock roller. The rubbery strip R thus stored on the stock roller may be composed of breaker strips, side walls strips, a layer of chafer or rubberized canvas web and a undercushion strip. On the other hand, the tire-building drum 10 has preliminarily wrapped round the outer peripheral surface thereof an unvulcanized rubbery sheet material (not shown) such as, for example, a tire case to be wrapped with the rubbery strip R to form a green tire.

Figure 5A:
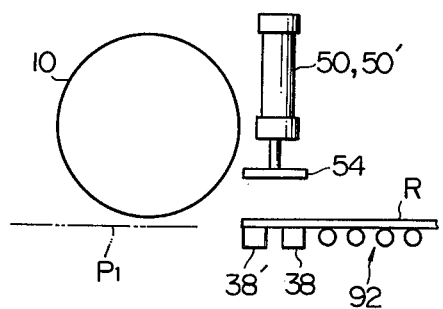
FIGS. 5A to 5D are schematic side elevation views showing initial preparatory steps to be taken by the rubbery-strip feeding apparatus embodying the present invention prior to starting the automatic operation to feed a rubbery strip to a tire-building drum.

When the feeding apparatus embodying the present invention is put into operation, the rubbery strip R stored on the stock roller is unwound and fed therefrom and is conveyed at a controlled velocity on the roller conveyor system 92 past the braking roller 94. At an initial stage of each cycle of operation of the feeding apparatus, the first and second carrier blocks 32 and 32' on the first and second worm shafts 24 and 24' are held in first predetermined fore-and-aft positions close to the rear bearing block 22' as shown in FIG. 1. Furthermore, the fluid-operated power cylinders 34 and 36 on the first carrier block 32 and the fluid-operated power cylinders 34' and 36' on the second carrier block 32' are all held in conditions having their respective cylinder rods axially protruded upwardly from the cylinder bodies thereof. The first and second transfer blocks 38 and 38' carried by these power cylinders are therefore maintained in the previously mentioned predetermined upper positions with respect to the carrier blocks 32 and 32', respectively, each of which is held in the first predetermined fore-and-aft position thereof with respect to the frame structure 14 and accordingly to the tire-building drum 10. The first transfer block 38 thus held in the predetermined upper position with respect to the first carrier block 32 held in the first predetermined fore-and-aft position with respect to the tire-building drum 10 assumes a position immediately below the previously mentioned predetermined cutting zone in front of the path of the rubbery strip R on the conveyor system 92. Likewise, the second transfer block 38' held in the predetermined upper position with respect to the second carrier block 32' held in the first predetermined fore-and-aft position with respect to the tire-building drum 10 assumes a position forwardly spaced apart a certain distance from the first transfer block 38. When the first and second transfer blocks 38 and 38' are held in such positions with respect to the first predetermined zone, there is a gap formed between the transfer blocks 38 and 38' and extending in a lateral direction of the frame structure 14 as will be seen from FIG. 1. Under these conditions, the contact strips 44 and 44' (FIGS. 3 and 4) forming part of the transfer blocks 38 and 38', respectively, have their upper surfaces located on a first predetermined horizontal plane $P_1$ substantially level with or slightly lower than the lower end of the tire-building drum 10 so that the transfer blocks 38 and 38' have their respective upper ends located on the first predetermined horizontal plane $P_1$ as schematically indicated in FIG. 5A of the drawings. For a predetermined period of time after the feeding apparatus is started, the tire-building drum 10 is held at rest with the preliminarily wrapped sheet material thereon. Furthermore, the valve provided in the passageway intervening between each of the inflatable tubular members 42 and 42' of the transfer blocks 38 and 38', respectively, and the source of fluid under pressure is closed so that the tubular members 42 and 42' are disconnected from the pressurized fluid source and are as a consequence held in flattened conditions in the concavities in the support member 40 and 40', respectively. On the other hand, the carrier block 70 and accordingly the cutter support block 76 of the cutting means are held in predetermined first lateral positions close to one of the bearing blocks such as the bearing block 56' on the side wall 46' of the frame structure 14 as shown in FIG. 2 with the pulsating-current motor 62 held at rest. The power cylinder 82 connected to the cutter support block 76 is held in a condition having its piston rod axially retracted into the cylinder body thereof so that the cutter support block 76 is held in the previously mentioned first angular position thereof. The cutter blade 90 secured to the cutter support block 76 is therefore held in the inoperative position having its edge portion raised on a horizontal plane above the predetermined cutting zone in front of the path of the rubbery strip R on the conveyor system 92. The cutter blade 90 is heated to a predetermined temperature by means of the heater element connected a power source (not shown). Furthermore, the power cylinders 50 and 50' of the rubbery-strip pressing means are maintained in conditions having their respective pistons rods 52 and 52' held axially retracted upwardly into the cylinder bodies thereof so that the pressing block 54 is held in a position raised over the predetermined cutting zone above the transfer blocks 38 and 38'.

The elongate rubbery strip R unwound from the stock roller is conveyed toward the predetermined cutting zone above the first and second transfer blocks 38 and 38' thus held in the respective first predetermined fore-and-aft positions thereof. Until the elongate rubbery strip R reaches the predetermined cutting zone, the power cylinders 50 and 50' forming part of the previously mentioned rubbery-strip pressing means are held in conditions having their respective piston rods 52 and 52' axially retracted upwardly into the cylinder bodies thereof. The pressing block 54 supported by the piston rods 52 and 52' is therefore upwardly spaced apart a predetermined distance from the upper ends, viz., the respective contact strips 44 and 44' (FIGS. 3 and 4) of the first and second transfer blocks 38 and 38' of the rubbery-strip carrier and transfer means as shown in FIG. 5A.

Figure 5B:
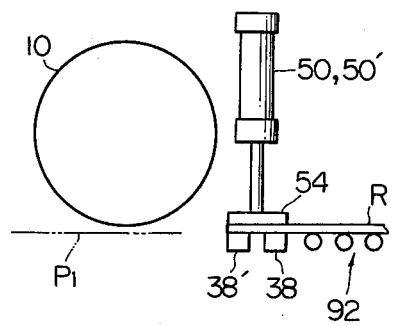

When the leading end portion of the rubbery strip R being conveyed on the roller conveyor system 92 reaches the predetermined cutting zone as schematically shown in FIG. 5A, the conveyor system 92 is brought to a stop so that the elongate rubbery strip R extending on the conveyor system 92 is held at rest with its leading portion received on the contact strips 44 and 44' of the transfer blocks 38 and 38', respectively. The power cylinders 50 and 50' of the rubbery-strip pressing means are then actuated to cause their respective piston rods 52 and 52' to axially protrude downwardly from the cylinder bodies thereof. It follows that the pressing block 54 carried by the piston rods 52 and 52' of the power cylinders 50 and 50' is caused to move downwardly into pressing contact with the upper surface of the leading end portion of the rubbery strip R as shown in FIG. 5B. The leading end portion of the rubbery strip R is thus pressed between the flat lower face of the pressing block 54 and the respective upper surfaces of the contact strips 44 and 44' on the tubular members 42 and 42' of the transfer blocks 38 and 38', respectively. As the inflatable tubular members 42 and 42' is held in flattened conditions in the concavities in the support members 40 and 40', respectively, as above mentioned, the leading end portion of the rubbery strip R is forcefully pressed against the respective upper surfaces of the contact strips 44 and 44' as shown in FIG. 3. By reason, in this instance, of the smoothness of the upper surfaces of the contact strips 44 and 44', the leading end portion of the rubbery strip R pressed onto the contact strips 44 and 44' has its lower surface closely attached to the upper surfaces of the contact strips 44 and 44' as if the particular portion were bonded or cemented to the surfaces of the contact strips 44 and 44'. After the leading end portion of the rubbery strip R is in this manner retained to the upper surfaces of the contact strips 44 and 44' of the first and second transfer blocks 38 and 38', the power cylinders 50 and 50' are operated to cause their piston rods 52 and 52' to axially retract upwardly into the cylinder bodies thereof so that the pressing block 54 carried by the piston rods 52 and 52' is upwardly moved into the initial position thereof above the leading end portion of the rubbery strip R on the transfer blocks 38 and 38'.

Figure 5C:
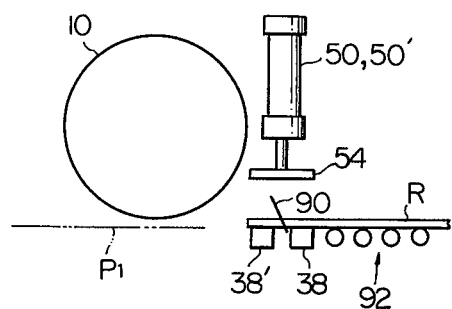
Figure 5D:
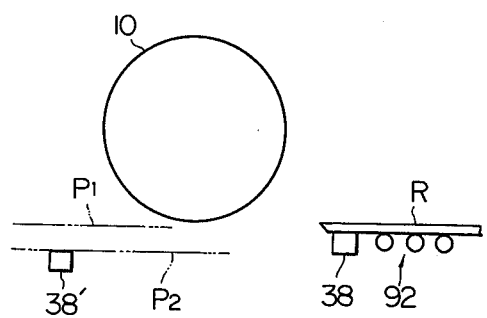

With the leading end portion of the rubbery strip R retained closely to the first and second transfer blocks 38 and 38' as described above, the power cylinder 82 forming part of the cutting means is actuated to cause its piston rod 86 to axially protrude from the cylinder body thereof and thereby causes the cutter support block 76 to turn from the first angular position to the previously mentioned second angular position thereof about the aligned center axes of the pivot pins 74 and 74' on the arm members 72 and 72'. It therefore follows that the cutter blade 90 secured to the cutter support block 76 positioned close to the bearing block 56' as above noted is moved from the inoperative position thereof to an operative position having its edge portion aligned, in a lateral direction of the rubbery-strip feeding apparatus, with the gap between the first and second transfer blocks 38 and 38' having the leading end portion of the rubbery strip R supported thereon. The pulsating-current motor 62 is then actuated to drive the driving pulley 64 for rotation with the output shaft of the motor 62. The rotation of the driving pulley 64 is transmitted through the endless belt 68 to the driven pulley 66 and by way of the driven pulley 66 to the worm shaft 58. The worm shaft 58 is therefore driven for rotation about the center axis thereof and causes the carrier block 70 and accordingly the cutter support block 76 to move on and along the worm shaft 58 from their respective predetermined first lateral positions close to the bearing block 56' toward predetermined second lateral positions close to the other bearing block 56 on the side wall 46 of the frame structure 14 by means of a gear incorporated in the carrier block 70 and held in mesh with the worm shaft 58. As the cutter support block 76 is thus driven to move along the worm shaft 58 and the guide rods 60 and 60' from the first predetermined lateral position toward the second predetermined lateral position thereof, the cutter blade 90 is caused to travel through the predetermined cutting zone above the lateral gap between the first and second transfer blocks 38 and 38' having the leading end portion of the rubbery strip R carried thereon. As a result of the movement of the carrier block 70 and accordingly the cutter support block 76 from the first predetermined lateral positions to the second predetermined lateral positions with respect to the frame structure 14, the cutter blade 90 completes a travel through the predetermined cutting zone throughout the width of the leading end portion of the rubbery strip R so that the initial leading end portion of the rubbery strip R is cut from the remainder of the rubbery strip R into a separate cut segment. As a consequence, the rubbery strip R on the conveyor system 92 has a new leading end portion formed on and partially attached to the smooth upper surface of the contact strip 44 of the first transfer block 38 as schematically shown in FIG. 5C of the drawings. The cut segment thus formed on the second transfer block 38' is removed from the contact strip 44' manually or automatically in a suitable manner. While the cut segment of the rubbery strip R is being removed from the contact strip 44' of the second transfer block 38', the pulsating-current motor 62 is actuated to drive the worm shaft 58 in the reverse direction so that the carrier block 70 and the cutter support block 76 are moved from the respective second predetermined lateral positions back to the respective first predetermined lateral positions thereof with the pressing block 54 held in the raised position above the paths of the blocks 70 and 76. After the second transfer block 38' is cleared of the cut segment of the rubbery strip R, the power cylinders 34' and 36' having the block 38' supported on the carrier block 32' are actuated to cause their respective piston rods to axially retract downwardly into the cylinder bodies thereof so that the second transfer block 38' is moved from the predetermined upper position to the previously mentioned predetermined lower position thereof with respect to the carrier block 32'. As the second transfer block 38' is thus moved to the lower or second predetermined position above the carrier block 32', the second pulsating-current motor 28' associated with the second transfer block 38' is actuated to drive the worm shaft 24' for rotation about the center axis thereof. The second carrier block 32' is therefore caused to move on and along the worm shaft 24' by means of the gear incorporated in the carrier block 32' and held in mesh with the worm shaft 24' and is thus driven to travel forwardly from its first predetermined fore-and-aft position close to the predetermined cutting zone past a second predetermined fore-and-aft position below the tire-building drum 10 and through the second predetermined fore-and-aft position to a third predetermined fore-and-aft position close to the front bearing block 22 on the frame structure 14 with the second transfer block 38' held in the predetermined lower position above the carrier block 32'. The second transfer block 38' held in the predetermined lower position with respect to the carrier block 32' has the upper surface of its contact strip 44' (FIG. 3) located on a second predetermined horizontal plane $P_2$ lower than the previously mentioned first predetermined horizontal plane $P_1$ which is level with or slightly lower than the lower end of the tire-building drum 10, as schematically indicated in FIG. 5D of the drawings. At the point of time when the carrier block 32' is moved into the third predetermined fore-and-aft position thereof, the second pulsating-current motor 28' is brought to a stop and as a consequence the carrier block 32' is brought to a stop in the particular position with respect to the tire-building drum 10. The initial preparatory steps taken by the feeding apparatus are now complete and, thus, the rubbery-strip feeding apparatus embodying the present invention is ready for automatic operation to feed the rubbery strip R to the tire-building drum 10 in consecutive cycles. At the stage when the initial preparatory steps are complete, the first transfer block 38 is held in the predetermined upper position with respect to the first carrier block 32 held in the first predetermined fore-and-aft position with respect to the tire-building drum 10 while the second transfer block 38' is held in the predetermined lower position with respect to the second carrier block 32' held in the third predetermined fore-and-aft position with respect to the drum 10.

Figure 5E:
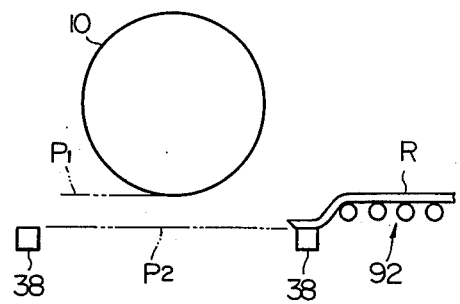
FIGS. 5E to 5L are views similar to FIGS. 5A to 5D but shows the consecutive cycles to automatically feed a rubbery strip to the tire-building drum subsequently to the initial preparatory steps.
Figure 5F:
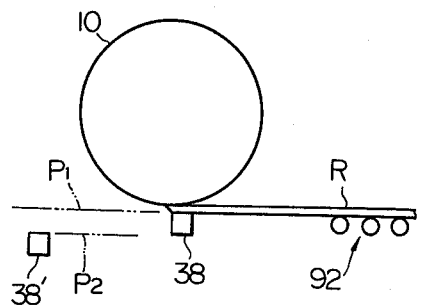
Figure 6:
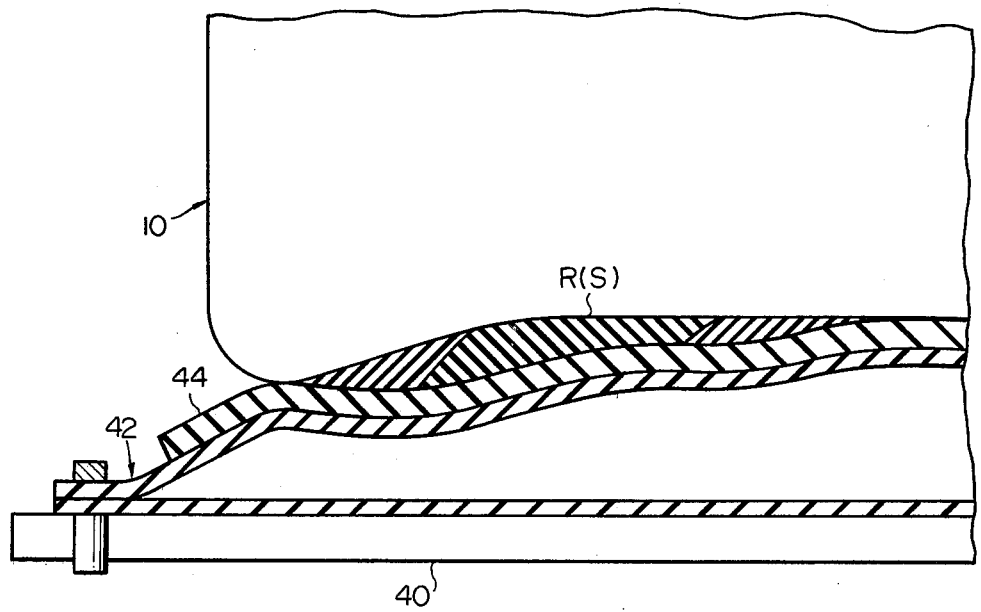
FIG. 6 is a horizontal cross sectional view showing a portion of the rubbery strip applied to the tire-building drum during a process in which a cut segment of the rubbery strip is to be wrapped round a tire-building drum in the feeding apparatus embodying the present invention.

After the second carrier block 32' of the rubbery-strip carrier and transfer means is moved into the third predetermined fore-and-aft position with respect to the tire-building drum 10 as above described, the power cylinders 34 and 36 on the first carrier block 32 are actuated to cause their respective piston rods to axially retract downwardly into the cylinder bodies thereof. The first transfer block 38 carried on the piston rods of the power cylinders 34 and 36 and having the leading end portion of the rubbery strip R attached to the upper surface of its contact strip 44 (FIGS. 3 and 4) is therefore caused to move downwardly from the predetermined upper position to the predetermined lower position above and with respect to the carrier block 32. The first transfer block 38 thus moved into the predetermined lower position above the carrier block 32 has the upper surface of its contact strip 44 located also on the above mentioned second predetermined horizontal plane $P_2$ and accordingly flush with the upper surface of the contact strip 44' (FIG. 3) of the second transfer block 38' as schematically indicated in FIG. 5E. The first pulsating-current motor 28 is now actuated to drive the worm shaft 24 for rotation about the center axis thereof. The first carrier block 32 is caused to move on and along the worm shaft 24 by means of the gear incorporated in the carrier block 32 and held in mesh with the worm shaft 24 and is thus driven to travel forwardly from its first predetermined fore-and-aft position close to the predetermined cutting zone to a second predetermined fore-and-aft position immediately below the tire-building drum 10 with the first transfer block 38 held in the predetermined lower position above the carrier block 32. As the carrier block 32 is moved forwardly from the first predetermined fore-and-aft position toward the second predetermined fore-and-aft position thereof, the elongate rubbery strip R having its leading end portion retained to the contact strip 44 of the first transfer block 38 is pulled forwardly on the conveyor system 92 and is further unwound from the stock roller by the tension produced in the rubbery strip R. When the carrier block 32 reaches the second predetermined fore-and-aft position thereof, the first pulsating-current motor 28 is de-energized and as a consequence the carrier block 32 is brought to a stop in the particular position with respect to the tire-building drum 10. The carrier block 32 being thus moved into the second predetermined fore-and-aft position thereof with the first transfer block 38 held in the predetermined lower position with respect to the carrier block 32, the first transfer block 38 also has the upper surface of its contact strip 44 (FIGS. 3 and 4) located on the above mentioned second predetermined horizontal plane $P_2$ below the lower end of the tire-building drum 10. The power cylinders 34 and 36 on the carrier block 32 are then actuated to cause their respective piston rods to axially protrude upwardly from the cylinder bodies thereof until the first transfer block 38 carried thereon reaches the predetermined upper position with respect to the carrier block 32 as shown in FIG. 5F of the drawings. Under these conditions, the leading end portion of the rubbery strip R attached to the contact strip 44 of the first transfer block 38 has its upper surface located on a horizontal plane slightly above the first predetermined horizontal plane $P_1$ and accordingly held in contact with the unvulcanized rubbery sheet material preliminarily wrapped around the outer peripheral surface of the tire-building drum 10. Immediately when or at least by the point of time when the contact strip 44 of the first transfer block 38 is thus brought into contact with the sheet material on the tire-building drum 10, the valve provided in the passageway intervening between the inflatable tubular member 42 (FIGS. 3 and 4) of the first transfer block 38 and the source of air under pressure is made open so that the tubular member 42 is inflated as shown in FIG. 4 with the pressurized air blown into the tubular member 42. The leading end portion of the rubbery strip R on the contact strip 42 of the first transfer block 38 is, accordingly, forcefully pressed against the outer surface of a lower end portion of the sheet material on the tire-building drum 10 as shown in FIG. 6 of the drawings. Since, in this instance, the leading end portion of the rubbery strip R is elastically pressed against the sheet material on the tire-building drum 10 due to the elasticity of the inflated tubular member 42, the rubbery strip R is amenable to the irregularity, if any, of the outer peripheral surface of the sheet material and is for this reason permitted to have its upper surface attached to the sheet material closely and with uniform pressure even though the outer peripheral surface of the sheet material on the tire-building drum 10 is irregular in thickness axially of the tire-building drum 10 as will be understood from the illustration of FIG. 6.

During a period of time when the first carrier block 32 is being moved from the first predetermined fore-and-aft position to the second predetermined fore-and-aft position thereof as above described, the leading end portion of the rubbery strip R is caused to longitudinally stretch between the front end of the conveyor system 92 and the contact strip 44 of the first transfer block 38 and tends to shrink longitudinally over its opposite side portions and to consequently invite reduction of width longitudinally of the leading end portion. Since the leading end portion of the rubbery strip R is closely attached and retained to the contact strip 44 of the first transfer block 38 throughout the width thereof in the rubbery-strip feeding apparatus embodying the present invention, the rubbery strip R is constrained from causing such shrinkage and is, as a consequence, permitted to maintain its initial thickness and width throughout the length of the leading end portion of the rubbery strip R being pulled toward the tire-building drum 10.

Figure 5G:
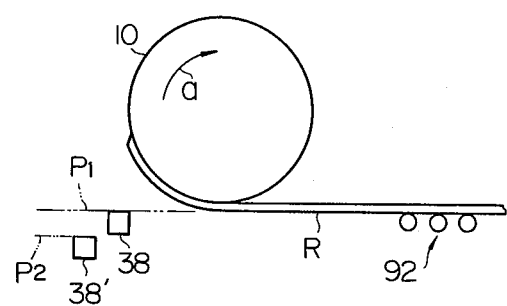

Now that the leading end portion of the rubbery strip R is pressed against the outer surface of the lower end portion of the sheet material on the tire-building drum 10 as described above, the tire-building drum 10 is driven for rotation about the center axis thereof in the direction of the arrow a (FIG. 1). As the tire-building drum 10 is thus caused to turn about the center axis thereof, the leading end portion of the rubbery strip R which has been retained to the contact strip 44 of the first transfer block 38 is detached from the contact strip 44 and is transferred to and wrapped round the outer peripheral surface of the sheet material on the tire-building drum 10 as schematically indicated in FIG. 5G of the drawings. In this instance, the leading end portion of the rubbery strip R is permitted to smoothly leave the contact strip 44 since the adhesion between the outer peripheral surface of the unvulcanized rubbery sheet material on the tire-building drum 10 and the upper, or now inner, surface of the leading end portion of the rubbery strip R being wrapped round the sheet material is more forceful than the adhesion between the lower or outer surface of the leading end portion of the rubbery strip R and the upper surface of the contact strip 44 (FIGS. 3 and 4) of the first transfer block 38. Where the rubbery strip R is to be wrapped direct on the outer peripheral surface of the tire-building drum 10 without an unvulcanized rubbery sheet material interposed therebetween, the adhesion between the rubbery strip R and the tire-building drum 10 overcomes the adhesion between the rubbery strip R and the contact strip 44 of the first transfer block 38 and accordingly the rubbery strip R is permitted to be detached from the contact strip 44 and transferred to the tire-building drum 10 if the outer peripheral surface of the tire-building drum 10 is finished to be smoother than the upper or outer surface of the contact strip 44.

Figure 5H:
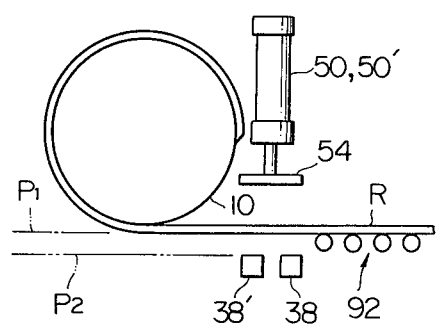

Simultaneously when the tire-building drum 10 is started for rotation, the first pulsating-current motor 28 is for a second time actuated to drive the worm shaft 24 for rotation about the center axis thereof so that the first carrier block 32 is moved on the worm shaft 24 further forwardly from the second predetermined fore-and-aft position thereof to a third predetermined fore-and-aft position close to the second carrier block 32' which has been moved into the third predetermined fore-and-aft position thereof, as indicated in FIG. 5G. In this instance, it is important that the motor 28 be controlled to drive the carrier block 32 to move at a speed equal to the circumferential speed of rotation of the tire-building drum 10 so that the leading end portion of the rubbery strip R can be smoothly transferred from the first transfer block 38 to the tire-building drum 10. At the point of time when the tire-building drum 10 is turned through a predetermined angle of, for example, 270 degrees from the initial angular position about the axis of rotation of the drum 10 and, as a consequence, the rubbery strip R is wrapped a predetermined length round the sheet material on the tire-building drum 10 as shown in FIG. 5H of the drawings, the motor 28 is once brought to a stop so that the tire-building drum 10 is permitted stay at rest temporarily. while the tire-building drum 10 is thus held at rest with the predetermined length of rubbery strip R carried thereon, the power cylinders 34 and 36 on the first carrier block 32 are operated to cause their respective piston rods to axially retract downwardly into the cylinder bodies thereof so that the first transfer block 38 cleared of the rubbery strip R is caused to move from the predetermined upper position to the predetermined lower position thereof with respect to the carrier block 32. The first and second pulsating-current motors 28 and 28' are actuated to drive the respectively associated worm shafts 24 and 24' for rotation in the directions opposite to the directions in which the worm shafts have thus far been driven to rotate about the respective center axes thereof. It follows that the first and second carrier blocks 32 and 32' are driven to move from the respective third predetermined fore-and-aft positions back to the respective first predetermined fore-and-aft positions thereof with the first and second transfer blocks 38 and 38' held in the respective predetermined lower positions thereof with respect to the carrier blocks 32 and 32', respectively, as schematically shown in FIG. 5H. The motors 28 and 28' are caused to stop when the carrier blocks 32 and 32' are thus moved into the respective first predetermined fore-and-aft positions thereof. The transfer blocks 38 and 38' on the first and second carrier blocks 32 and 32', respectively, are now held in the positions below the previously mentioned predetermined cutting zone in front of the path of the rubbery strip R on the conveyor system 92. Under these conditions, the carrier block 70 and the associated cutter support block 76 are held in their respective first predetermined lateral positions with respect to the frame structure 14. The cutter support block 76 is, furthermore, held with respect to the carrier block 70 in the previously mentioned first angular position having the edge portion of the cutter blade 90 held in the inoperative position and located above a horizontal plane aligned, in a lateral direction of the rubbery-strip feeding apparatus, with the gap between the first and second transfer blocks 38 and 38' as also schematically shown in FIG. 5H. By the time when the transfer blocks 38 and 38' are moved back to the respective first predetermined fore-and-aft positions thereof, the valve provided in the passageway between the inflatable tubular member 42 of the first transfer block 38 and the source of fluid under pressure is closed and the internal space of the tubular member 42 is made open to the atmosphere. The tubular member 42 which has been inflated with pressurized air is thus allowed to collapse in the concavity in the support member 40 of the first transfer block 38 with the inflatable tubular member 42' of the second transfer block 38' maintained in the flattened condition thereof.

Figure 5I:
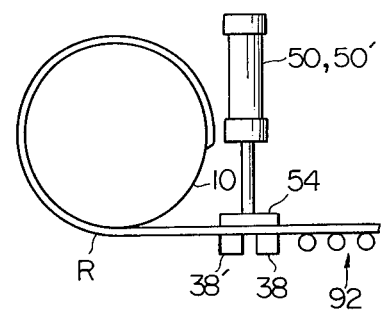
Figure 5J:
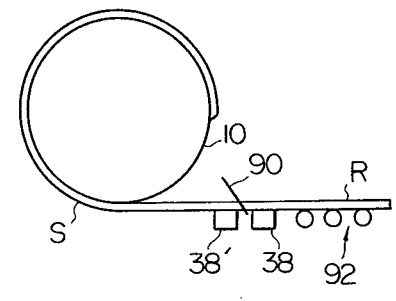

When the first and second transfer blocks 38 and 38' are moved back to the respective first predetermined fore-and-aft positions thereof as above described, the power cylinders 34 and 36 carrying the first transfer block 38 and the power cylinders 34' and 36' carrying the second transfer block 38' are actuated to drive their respective piston rods to axially protrude upwardly from the respective cylinder bodies thereof. This causes the first and second transfer blocks 38 and 38' to move upwardly from the predetermined lower positions to the predetermined upper positions thereof with respect to the first and second carrier blocks 32 and 32', respectively. The power cylinders 50 and 50' of the rubbery-strip pressing means are then actuated to cause their respective piston rods 52 and 52' to axially protrude downwardly from the cylinder bodies thereof. It follows that the pressing block 54 carried by the piston rods 52 and 52' of the power cylinders 50 and 50' is caused to move downwardly into pressing contact with the upper surface of the rubbery strip R in the predetermined cutting zone as shown in FIG. 5I of the drawings. As a consequence, the rubbery strip R in the cutting zone is pressed between the flat lower face of the pressing block 54 and the respective upper surfaces of the contact strips 44 and 44' on the tubular members 42 and 42' of the transfer blocks 38 and 38', respectively. The inflatable tubular members 42 and 42' being held in the flattened conditions in the concavities in the support members 40 and 40', respectively, as above mentioned, the rubbery strip R in the predetermined cutting zone is forcefully pressed against the respective upper surfaces of the contact strips 44 and 44' as shown in FIG. 3. After the rubbery strip R in the predetermined cutting zone is in this manner retained to the upper surfaces of the respective contact strips 44 and 44' of the first and second transfer blocks 38 and 38', the power cylinders 50 and 50' are operated to cause their respective piston rods 52 and 52' to axially retract upwardly into the cylinder bodies thereof so that the pressing block 54 is upwardly moved into the initial position thereof above the predetermined cutting zone. The power cylinder 82 forming part of the cutting means is then actuated to cause its piston rod 86 to axially protrude from the cylinder body thereof and thereby causes the cutter support block 76 to turn from the first angular position to the second angular position thereof about the aligned center axes of the pivot pins 74 and 74' on the arm members 72 and 72'. It therefore follows that the cutter blade 90 secured to the cutter support block 76 is moved from the inoperative position thereof to the previously mentioned operative position having its edge portion aligned, in a lateral direction of the rubbery-strip feeding apparatus, with the horizontal gap between the first and second transfer blocks 38 and 38' in the respective first predetermined fore-and-aft positions thereof as schematically indicated in FIG. 5J of the drawings. The pulsating-current motor 62 is then actuated to drive the worm shaft 58 for rotation about the center axis thereof and causes the carrier block 70 and accordingly the cutter support block 76 to move on and along the worm shaft 58 from their respective predetermined first lateral positions close to the bearing block 56' toward the predetermined second lateral positions close to the other bearing block 56 on the side wall 46 of the frame structure 14. As the cutter support block 76 is thus driven to move along the worm shaft 58 and the guide rods 60 and 60' from the first predetermined lateral position toward the second predetermined lateral position thereof, the cutter blade 90 is caused to travel through the predetermined cutting zone immediately above the lateral gap between the first and second transfer blocks 38 and 38' having the rubbery strip R carried on the contact strips 44 and 44' thereof. When the cutter blade 90 completes a travel through the predetermined cutting zone throughout the width of the rubbery strip R, the leading end portion of the rubbery strip R is cut from the remainder of the rubbery strip R and forms a separate cut segment S having a trailing end portion received on and retained to the upper surface of the contact strip 44' of the second transfer block 38' with a new leading end portion of the rubbery strip R formed and received on the upper surface of the contact strip 44 of the first transfer block 38. The pulsating-current motor 62 is thereafter actuated to drive the worm shaft 58 in the reverse direction so that the carrier block 70 and the cutter support block 76 are moved from the respective second predetermined lateral positions back to the respective first predetermined lateral positions thereof with the pressing block 54 held in the raised position above the paths of the blocks 70 and 76. The angular position in which the tire-building drum 10 is temporarily brought to a stop as above described is predetermined so that the length of the cut segment S thus separated from the elongate rubbery strip R on the conveyor system 92 is equal to the outer circumferential length of the sheet material preliminarily wrapped on the tire-building drum 10.

Figure 5K:
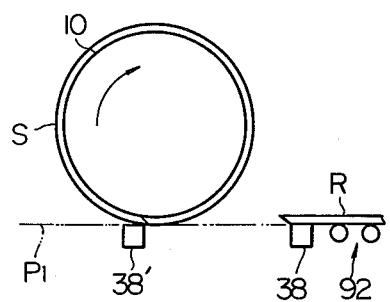
Figure 5L:
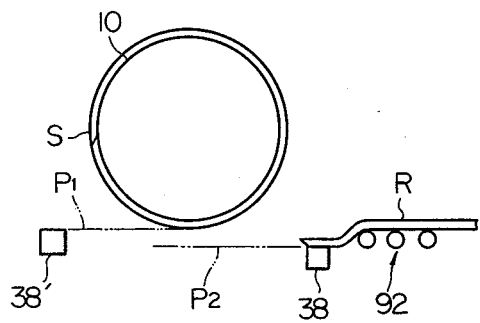

The tire-building drum 10 is then actuated for a second time for further rotation from the above mentioned angular position about the axis of rotation thereof. Simultaneously as the tire-building drum 10 is thus caused to start rotation, the pulsating-current motor 28' associated with the second transfer block 38' is actuated to drive the worm shaft 24' for rotation about the center axis thereof. As the tire-building drum 10 is driven to turn from the angular position, the second carrier block 32' is caused to move on and along the worm shaft 24' and is thus driven to travel forwardly from the first predetermined fore-and-aft position close to the predetermined cutting zone to the second predetermined fore-and-aft position below the tire-building drum 10 with the second transfer block 38' held in the predetermined upper position above the carrier block 32'. The result is that the trailing end portion of the cut segment S which is partially already transferred to the tire-building drum 10 and partially retained to the contact strip 44' of the second transfer block 38' is transferred from the second transfer block 38' to the tire-building drum 10 until the cut segment S is wrapped completely around the outer peripheral surface of the sheet material on the tire-building drum 10. In this instance, the motor 28' is controlled to operate in such a manner that a proper tension is produced in the trailing end portion of the cut segment S being applied to the sheet material on the tire-building drum 10. At the point of time when the second carrier block 32' reaches the second predetermined fore-and-aft position thereof below the lower end of the tire-building drum 10 and accordingly the cut segment S is completely wrapped round the sheet material on the tire-building drum 10 as shown in FIG. 5K of the drawings, the tire-building drum 10 is brought to a full stop and at the same time the pulsating-current motor 28' is de-energized so that the carrier block 32' is brought to a stop in the particular fore-and-aft position. The second carrier block 32' being thus moved into the second predetermined fore-and-aft position thereof with the second transfer block 38' held in the predetermined upper position with respect to the carrier block 32', the second transfer block 38' has the upper surface of its contact strip 44' (FIG. 3) located on the above mentioned first predetermined horizontal plane $P_1$ flush with or slightly below the lower end of the tire-building drum 10. When the second carrier block 32' is moved into the second predetermined fore-and-aft position below the tire-building drum 10, the valve provided in the passageway intervening between the inflatable tubular member 42' (FIG. 3) of the second transfer block 38' and the source of air under pressure is made open so that the tubular member 42' is inflated with the pressurized air blown into the tubular member 42'. The trailing end portion of the cut segment S intervening between the sheet material on the tire-building drum 10 and the contact strip 42' of the second transfer block 38' is, accordingly, forcefully pressed against the outer surface of a lower end portion of the sheet material on the tire-building drum 10. Because, in this instance, the trailing end portion of the rubbery strip R is elastically pressed against the sheet material on the tire-building drum 10 due to the elasticity of the inflated tubular member 42', the rubbery strip R is permitted to have its upper surface attached to the outer surface of the lower end portion of sheet material closely and with uniform pressure throughout the width of the rubbery strip R and the width of the sheet material. Because, furthermore, of the fact that the length of the cut segment S cut from the supplied elongate rubbery strip R is correctly equal to the circumferential length of the outer peripheral surface of the sheet material on the tire-building drum 10 as previously noted, the trailing end portion of the cut segment S is accurately spliced to the leading end portion of the cut segment S, there being thus no gap or excessive overlap formed between the trailing and leading end portions of the cut segment S when the cut segment S is completely applied to the sheet material. Even if, in this instance, the sheet material preliminarily wrapped round the tire-building drum 10 may have a thickness which varies axially of the tire-building drum 10, the trailing end portion of the cut segment S can be spliced correctly to the leading end portion of the cut segment S since the the second transfer block 38' carried on the carrier block 32' moved into the second predetermined fore-and-aft position thereof is located accurately at the leading end of the cut segment S attached to the sheet material on the tire-building drum 10.

After the cut segment S has been completely transferred from the second transfer block 38' to the tire-building drum 10, the tire-building drum 10 is caused to continue its turning motion through a predetermined angle a thereof and, concurrently, the second pulsating-current motor 28' is actuated to drive the carrier block 32' to move further forwardly from the second prededrum and said second smooth surface portion; elastically pressing the trailing end portion of the cut segment against the outer peripheral surface of the tire-building drum.

7. A method as set forth in claim 6, in which said tire-building drum is temporarily brought to a stop after the tire-building drum is turned through a predetermined angle about the center axis thereof and in which said leading end portion of the rubbery strip is cut from the remainder of the rubbery strip and the resultant cut segment of the rubbery strip is detachably retained to said second smooth surface portion while the tire-building drum is held at rest.

* * * * *